United States Patent Office 3,457,332
Patented July 22, 1969

3,457,332
THIOL- AND DITHIOL-PHOSPHORIC ACID ESTERS
Gerhard Schrader, Wuppertal-Cronenberg, and Hans Scheinpflug, Leverkusen, Germany, assignors to Farbenfabriken Bayer Aktiengesellschaft, Leverkusen, Germany, a corporation of Germany
No Drawing. Filed Nov. 30, 1966, Ser. No. 597,848
Claims priority, application Germany, Dec. 8, 1965, F 47,865
Int. Cl. C07f 9/16; A01n 9/36
U.S. Cl. 260—935        8 Claims The present invention relates to particular new thiol- and dithiol-phosphoric acid esters which possess fungitoxic properties, to their compositions with dispersible carrier vehicles, and to methods for their production and use.

In an article by B. Cheymol, P. Chabrier, Nguyen Thanh Thuong and J. P. Tillement in "Comptes Rendus des Séances de la Societe de Biologie," 158, No. 1 (1964), pages 24 et seq., there is described O,O-dimethyl-O-ethoxycarbonyl-phosphoric acid ester, which has a certain cholinesterase-inhibiting effect while also having a relatively low intra-peritoneal toxicity towards warm-blooded animals (determined on mice).

It is also known from articles by G. Hilgetag et al. [cf. "Zeitschrift für Angewandte Chemie," 71 (1959), page 137, and 69 (1957), page 205; and "Journal für praktische Chemie," 8 (1959), pages 207 to 223], as well as by Y. Nishizawa ["Agricultural Biological Chemistry," 25 (1961), pages 820 to 828] that O,O-dimethyl-O-(4-nitrophenyl)thiono-phosphoric acid ester is a good methylating agent which readily yields a methyl group to all nucleophilic reagents.

Furthermore, U.S. Patent 2,690,450 describes thiolphosphoric acid aryl esters which possess parasiticidal properties, which are especially insecticidal but also fungicidal in nature. From this U.S. patent, however, it only follows that the above-mentioned compounds are suitable as specific fungicides for combating brown rot (*Scerotinia fructicola*) and potato blight (*Alternaria solani*). On the other hand, it cannot be concluded therefrom whether the compounds mentioned also possess an effectiveness sufficient for practical purposes against fungi causing diseases on rice plants, particularly those caused by the fungus *Piricularia oryzae*.

It is an object of the present invention to provide particular new thiol- and dithiol-phosphoric acid esters which possess valuable fungicidal properties, to provide active compositions in the form of mixtures of such compounds with solid and liquid dispersible carrier vehicles, to provide a process for producing such compounds and to provide methods of using such compounds in a new way, especially for combating fungi.

Other and further objects of the present invention will become apparent from a study of the within specification and accompanying examples.

It has now been found in accordance with the present invention that the particular new O-alkoxycarbonyl-S-alkyl-thiophosphoric acid aryl esters of the general formula:

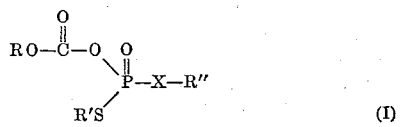

(I)

in which R is selected from the group consisting of lower alkyl and chlorolower alkyl, R' is lower alkyl, R" is selected from the group consisting of phenyl which is substituted with a substituent selected from the group consisting of chloro, nitro, cyano, thiocyano, lower alkyl, lower alkoxy, lower alkyl mercapto, lower alkyl sulfoxyl, lower alkyl sulfonyl, and mixtures of such substituents; N-methyl-benzazimido; 4-methyl-coumarin-7-yl; and 3-chloro-4-methyl-coumarin-7-yl; and X is selected from the group consisting of oxygen and sulfur, have markedly strong fungicidal properties.

It has been further found in accordance with the present invention that a process for the production of thiol- or dithiol-phosphoric acid esters of Formula I above may be provided which comprises reacting S-alkyl-O-aryl-thiol- or S-alkyl-S-aryl-dithiol-phosphoric acid salts of the general formula

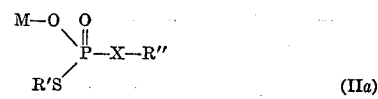

(IIa)

with haloformic acid esters of the formula

(IIb)

The course of the production process according to the present invention may be illustrated by the following reaction equation:

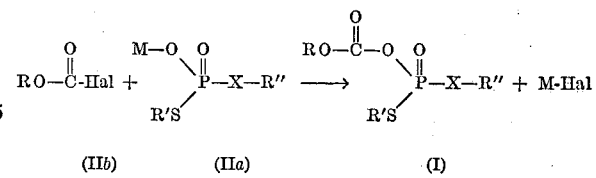

(IIb)        (IIa)              (I)

In the aforementioned formulae, the symbols R, R' and R" are the same as defined above, M denotes an alkali metal atom, an ammonium or lower tetraalkyl-ammonium group, such as sodium, potassium, lithium, the —NH$_4$ group, tetramethyl-ammonium ion, etc., and Hal denotes a halogen atom such as chloro.

Individual examples of the haloformic acid esters of Formula IIb above usable as starting materials in the process of the present invention include the following: chloroformic acid-methyl, ethyl, isopropyl, sec.-butyl, 2,2,2-trichloroethyl and -2,2,2-trichloroisopropyl esters, and the like.

The compounds of the general Formula IIa usable as corresponding starting materials can be obtained in a technically simple manner. For example, the alkali metal salts concerned can be prepared by reacting the corresponding O-methyl-O-alkyl- (preferably O,O-dimethyl-) -O-aryl-thiono- or -S-aryl-thionothiol-phosphoric acid esters with alkali metal iodides, whereas the tetraalkyl ammonium salts can be obtained by the action of one mol of trialkylamine on one mol of the last-mentioned thiophosphoric acid esters.

The production process of the instant invention is preferably carried out in the presence of solvents or diluents. Almost all inert organic solvents may be used for this purpose, for example hydrocarbons (which may optionally be halogenated) such as benzine, benzene, toluene, xylene or chlorobenzene; ethers, such as diethyl ether, dibutyl ether and dioxan; and ketones, such as acetone, methyl ethyl ketone, methyl isopropyl ketone and methyl isobutyl ketone. Lower boiling nitriles, however, have proved to be especially suitable, i.e., such as acetonitrile and propionitrile.

The reaction according to the present process can be carried out within a fairly wide temperature range. The process is generally carried out at substantially between about 15 and 80° C., preferably at 20 to 30° C. However, since the reaction usually proceeds at the beginning with a more or less strong positive evolution of heat, it is often necessary to cool the reaction mixture externally in order to maintain the temperature within the stated temperature range.

When carrying out the instant process, equimolar amounts of the corresponding S-alkyl-O-aryl-thiol- or S-alkyl-S-aryl-dithiol-phosphoric acid salts and haloformic acid esters may be used. Furthermore, it has proved to be expedient to prepare the solution or suspension of the phosphoric acid salt in a suitable diluent, to add pyridine (for example several cubic centimeters thereof) as catalyst to the mixture, and then to add dropwise, with stirring, the haloformic acid ester concerned. When the exothermal reaction has subsided, the mixture is further stirred for some time (e.g., 1 to 4 hours) to complete the reaction, optionally while heating to 50 to 80° C., then either the separated alkali metal or ammonium halide is filtered off and the filtrate evaporated under reduced pressure, or the mixture is poured into water and the inorganic salt is thus dissolved out, the reaction product frequently precipitating in crystalline form. In other cases, the reaction mixture is further worked up by taking up the resultant oily product in an organic solvent, preferably a hydrocarbon, e.g., benzene, washing and drying the organic phase and distilling off the solvent.

According to a special method of carrying out the instant process, the corresponding S-alkyl-O-aryl-thiol- or S-alkyl-S-aryl-dithiol-phosphoric acid salts are not prepared in bulk. Instead, the appropriate O-methyl-O-alkyl-O-aryl-thiol- or O-methyl-O-alkyl-S-aryl-dithiol-phosphoric acid esters are reacted with alkali metal iodide in a suitable solvent, with subsequent stirring of the mixture for a prolonged time (e.g., overnight) at a slightly elevated temperature, followed by immediate mixing of it with the haloformic acid ester concerned after first adding the catalyst yet without removing the solvent or isolating the intermediate product.

The particular new thiophosphoric acid esters of the present invention are usually obtained in the form of colorless to pale yellow oils which, for the most part, are insoluble or hardly soluble in water, and which cannot be distilled without decomposition even under strongly reduced pressure; some, however, are solid crystalline substances which can be recrystallized from the conventional solvents.

Advantageously, the instant thiophosphoric acid ester compounds are surprisingly characterized by a strong fungitoxic effectiveness and a wide spectrum of activity. It is indeed further surprising that they possess, in spite of this outstanding action against phytopathogenic fungi, only a low toxicity towards warm blooded animals (mean toxicity $DL_{50}$ on rats per os is 100 to 1000 mg./kg. of animal weight). An additional advantage is the excellent compatibility with higher plants of the instant active compounds. On account of these properties, such active compounds are eminently suitable for use as plant protective agents against fungous diseases. Fungicides based on these active compounds can be used for combating a great variety of fungi, for example Archimycetes, Phycomycetes, Ascomycetes, Basidiomycetes, and Fungi Imperfecti. The instant products have proved to be especially suitable for use against fungous rice diseases, in particular against those caused by the fungus Piricularia oryzae. The particular new compounds provided in accordance with the present invention exhibit significantly an excellent protective and curative activity especially against this fungus.

Furthermore, the instant compounds can also be employed for combating other fungi causing diseases on rice and on other cultivated plants. Such active compounds possess a special activity against the following fungi species:

Cochliobolus miyabeanus
Mycosphaerella spec.
Corticium spec.
Cerospora spec.
Alternaria spec.
Botrytis spec.

The active compounds according to the present invention also show a markedly good action against fungi which attack the plant in the soil and may, in some cases, cause tracheomycoses, such as Fusarium cubense,
Fusarium dianthi,
Verticillium albo-atrum, and
Phialophora cinerescens.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance, by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.) amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surfaceactive agents, for this purpose: emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances such as other fungicides as well as herbicides, insecticides, bactericides, etc., if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0005 and 5% by weight, and preferably 0.005 and 1% by weight, of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.0005 and 95% by weight, and preferably 0.005 and 95% by weight, of the mixture. In special cases, however, it is possible or even necessary to go above or below the foregoing ranges of concentration as the artisan will appreciate.

Furthermore, the present invention contemplates methods of selectively controlling and combating fungi, which comprise applying to at least one of (a) such fungi and (b) their habitat, a fungicidally effective amount of the particular compound of the invention alone or together with a carrier vehicle as noted above. The instant formulations or compositions are applied in the usual manner, for example, by spraying, atomizing, vaporizing, scattering, dusting, watering, springling, pouring, and the like, especially to plants, seeds or soil.

The outstanding fungitoxic, i.e., fungicidal, effectiveness of the particular new thiophosphoric acid esters of the present invention, as well as their superiority in comparison with known products of analogous constitution and of the same type of activity, can be seen from the following test results, which are set fourth by way of illustration and not limitation:

EXAMPLE 1

Piricularia test/liquid preparation of active compound

| | Parts by weight |
|---|---|
| Solvent, acetone | 1 |
| Dispersing agent, sodium oleate | 0.05 |
| Other additive, gelatin | 0.2 |
| Water, $H_2O$ | 98.75 |

The amount of active compound required for the desired concentration in the spray liquor is mixed with the stated amount of solvent and the concentrate obtained is diluted with the stated amount of water containing the other additive and the dispersing agent.

Test for protective effect

Thirty rice plants, which are about 14 days old, are sprayed with the spray liquor until dripping wet. The plants remain in a greenhouse at temperatures of 22–24° C. and at a relative atmosphere humidity of about 70%, until dry. They are then inoculated with an aqueous suspension of 100,000 to 200,000 spores/ml. of *Piricularia oryzae* and placed in a chamber at 24–26° C. and at a relative atmospheric humidity of 100°.

Five days after inoculation, the degree of infestation of all the leaves of the treated plants which were present at the time of inoculation is determined as a percentage of the untreated but also inoculated control plants. 0% means that no infestation occurred and 100% means that the infestation is exactly the same as that of the control plants.

TABLE 1.—PIRICULARIA TEST/LIQUID PREPARATION OF ACTIVE COMPOUND

| Active compound (constitution) | Infestation as percent of the infestation of the untreated control at a concentration of the active compound (percent) of— | | | |
|---|---|---|---|---|
| | 0.05 | 0.025 | 0.01 | 0.005 |
| (III) $iC_3H_7O-CO-O\diagdown\overset{O}{\underset{}{\parallel}}P-O-$ (2,4,5-trichlorophenyl), $CH_3S\diagup$ | pr. 0 | 0 | 0 | 25 |
| (IV) $sec.C_4H_9O-CO-O\diagdown\overset{O}{\underset{}{\parallel}}P-O-$ (2,4,5-trichlorophenyl), $CH_3S\diagup$ | pr. 0 | 0 | 0 | 50 |
| (V) $C_2H_5O-CO-O\diagdown\overset{O}{\underset{}{\parallel}}P-O-$ (2,4,5-trichlorophenyl), $CH_3S\diagup$ | pr. 0 | 0 | 25 | |
| (VI) $iC_3H_7O-CO-O\diagdown\overset{O}{\underset{}{\parallel}}P-O-$ (4-methylthio-3-methylphenyl), $CH_3S\diagup$ | pr. 0 | 3 | 100 | |
| (VII) $iC_3H_7O-CO-O\diagdown\overset{O}{\underset{}{\parallel}}P-S-CH_2-N$ (benzotriazinon-yl), $CH_3S\diagup$ | pr. 0 | 50 | 75 | |
| (A) $(C_2H_5O)_2\overset{O}{\underset{}{\parallel}}P-S-$ (4-nitrophenyl) | pr. 18 | 50 | 100 | |

Comparative preparation known from U.S. Patent 2,690,450.
pr. means protective effect; cur. means curative effect.

The following examples are given for the purpose of illustrating, without limiting, the instant process for producing the particular new compounds in accordance with the present invention:

EXAMPLE 2

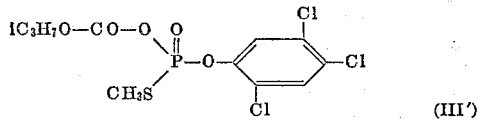
(III')

85 g. (0.25 mol) monosodium-S-methyl-O-(2,4,5-trichlorophenyl)thiol-phosphoric acid ester are suspended in 300 cc. acetonitrile. 1 cc. pyridine as catalyst is added to this suspension, which is then treated dropwise at 25 to 27° C., while stirring, with 33 g. chloroformic acid isopropyl ester (B.P. 104° C./760 mm. Hg). The reaction mixture is thereafter heated at 60° C. for a further 2 hours and diluted with 500 cc. benzene. The benzene solution is washed with a 25% sodium chloride solution and subsequently dried over sodium sulfate. After distilling off the benzene, there are obtained 50 g. of O-isopropoxycarbonyl-S-methyl-O-(2,4,5-trichlorophenyl)thiol - phosphoric acid ester, corresponding to a yield of 51% of the theoretical. About 5% of such new active compound is soluble in water.

*Analysis.*—Calculated (for molecular weight 394): P, 7.9%; S, 8.1%; Cl, 27.1%. Found: P, 8.0%; S, 9.0%; Cl, 28.0%.

On rats per os an application of 1000 mg. of such active compound per kg. of animal weight shows no result.

The monosodium - S - methyl-O-(2,4,5 - trichlorophenyl)-thiol-phosphoric acid ester required as starting material is produced as follows:

78 g. (0.5 mol) sodium iodide are dissolved in 1000 cc. acetone, and 161 g. (0.5 mol) O,O-dimethyl-O-(2,4,5-trichlorophenyl)thiono-phosphoric acid ester are added to the solution. The reaction mixture is subsequently stirred at 40 to 50° C. for a further 3 hours and then cooled to room temperature. The monosodium-S-methyl-O-(2,4,5-trichlorophenyl)thiol-phosphoric acid ester of the following constitution

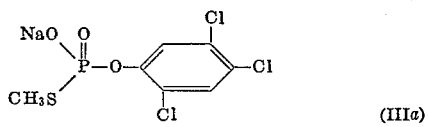
(IIIa)

precipitates. The salt-like precipitate is filtered off with suction, washed with ether and air-dried. The yield amounts to 160 g. (97% of theory).

EXAMPLE 3

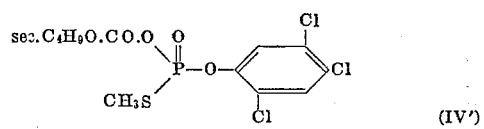
(IV')

A solution of 85 g. (0.25 mol) monosodium-S-methyl-O-(2,4,5-trichlorophenyl)thiol-phosphoric acid ester (prepared in an analogous manner to the corresponding starting material of Example 2) in 300 cc. acetonitrile is first admixed with 1 cc. pyridine and subsequently dropwise at 20° C., while stirring, with 39 g. chloroformic acid-sec.-butyl ester (B.P. 32° C./12 mm. Hg). The reaction mixture is thereafter stirred at 60 to 70° C. for 3 hours and then worked up as described in Example 2. There are thus obtained 60 g. (58% of theory) of O-sec-butoxy-carbonyl-S-methyl - O - (2,4,5 - trichlorophenyl) thiol-phosphoric acid ester in the form of a water-insoluble, colorless oil.

*Analysis.*—Calculated (for molecular weight 408): P, 7.6%; S, 7.9%; Cl, 26.2%. Found: P, 8.0%; S, 8.2%; Cl, 27.0%.

On rats per os the mean toxicity of such compound is 1000 mg./kg. of animal weight.

EXAMPLE 4

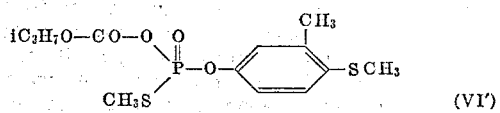
(VI')

72 g. (0.25 mol) monosodium-S-methyl-O-(3-methyl-4-methylmercaptophenyl)thiol-phosphoric acid ester are suspended in 300 cc. acetonitrile. This suspension is first admixed with 1 cc. pyridine, then dropwise, while stirring, with 33 g. chloroformic acid isopropyl ester at 25 to 30° C. The mixture is thereafter heated at 60° C. for a further 2 hours and then worked up as described in Example 2. 50 g. of O-isopropoxy-carbonyl-S-methyl-O-(3-methyl - 4 - methylmercaptorphenyl)thiol-phosphoric acid ester are obtained in the form of a water-insoluble, pale yellow oil.

*Analysis.*—Calculated (for molecular weight 350): P, 8.9%; S, 18.3%. Found: P, 9.1%; S, 19.0%.

On rats per os such compound has a mean toxicity ($DL_{50}$) of 250 mg./kg. of animal weight.

The monosodium-S-methyl-O-(3 - methyl-4-methylmercaptophenyl)thiol-phosphoric acid ester used as starting material can be prepared as follows:

A solution of 152 g. (1 mol) sodium iodide in 2500 cc. acetone is mixed with 278 g. O,O-dimethyl-O-(3-methyl-4-methylmercaptophenyl)thiono - phosphoric acid ester. The reaction mixture is subsequently stirred at 40 to 50° C. for a further 5 hours, then cooled to room temperature and the resultant monosodium salt of the following constitution

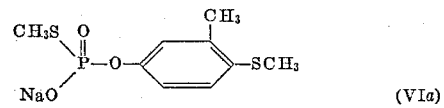
(VIa)

is filtered off with suction.

EXAMPLE 5

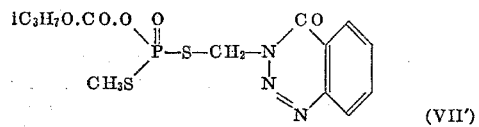
(VII')

82 g. (0.25 mol) monosodium-S-methyl-S-(3,4-dihydro-4 - oxo-1,2,3-benzotriazin-3-yl-methyl)dithiol-phosphoric acid ester are dissolved in 300 cc. acetonitrile. This solution is first treated with 1 cc. pyridine and subsequently dropwise, while stirring, with 35 g. (0.25 mol) chloroformic acid isopropyl ester. The reaction mixture is thereafter heated at 60° C. for a further 2 hours and then worked up as described in Example 2. There are obtained in this manner 50 g. (52% of theory) of O-isopropoxy-carbonyl-S-methyl-S-(3,4-dihydro-4-oxo - 1,2,3 - benzotriazin-3-yl-methyl)dithiol-phosphoric acid ester in the form of a water-insoluble, yellow oil.

*Analysis.*—Calculated (for molecular weight 389): P, 7.9%; S, 16.4%; N, 10.8%. Found: P, 7.2%; S, 16.0%; N, 11.0%.

On rats per os the mean toxicity ($DL_{50}$) of such compound is 100 mg./kg. of animal weight.

The monosodium-S-methyl-S-(3,4 - dihydro-4-oxo-1,2,3-benzotriazin-3-yl-methyl)dithiol-phosphoric acid ester required as starting material can be obtained as follows:

153 g. (1 mol) sodium iodide are dissolved in 1500 cc. acetone, and this solution is admixed with 317 g. (1 mol) O,O-dimethyl-S-(3,4-dihydro-4-oxo-1,2,3-benzotriazin-3-yl-methyl)thionothiol-phosphoric acid ester. The mixture is stirred at 50° C. for 3 hours, then cooled to room temperature, and the precipitated monosodium salt of the following constitution

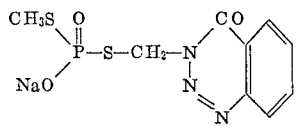
(VIIa)

is filtered off with suction.

EXAMPLE 6

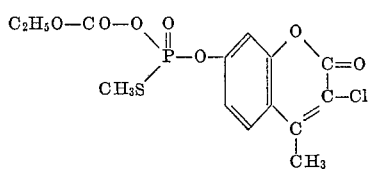
(VIII)

A solution of 104. g. (0.3 mol) mono-sodium-S-methyl-O-(3-chloro-4-methyl-coumarin - 7 - yl)thiolzphosphoric acid ester in 500 cc acetonitrile is first treated with 2 cc. pyridine and then dropwise, while stirring, with 43 g. chloroformic acid ethyl ester at 20 to 30° C. When the addition is completed, the reaction mixture is stirred at 60 to 70° C. for a further 2 hours and then poured into 4 liters of water. During this procedure the reaction product separates in the form of colorless crystals. The yield amounts to 66 g. corresponding to 56% of theory. The resulting O - ethoxycarbonyl-S-methyl - O - (3 - chloro-4-methyl-coumarin-7-yl)thiolphosphoric acid ester melts at 190° C.

On rats per os the mean toxicity ($DL_{50}$) amounts to more than 1000 mg./kg. animal weight.

The monosodium - S - methyl-O-(3-chloro-4-methyl-coumarin-7-yl)thio-phosphoric acid ester required as starting material may be produced, for example, as follows:

48 g. (0.3 mol.) sodium iodide are dissolved in 100 cc. acetone. This solution is admixed with 100 g. (0.3 mol.) O,O - dimethyl - O - (3 - chloro - 4 - methyl - coumarin-7-yl)thiono-phosphoric acid ester. The reaction mix is stirred at 40 to 50° C. for a further 3 hours, then cooled to room temperature, and the precipitated sodium salt of the following constitution

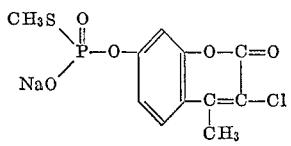
(VIIIa)

is filtered off with suction.

EXAMPLE 7

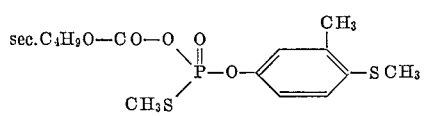
(IX)

72 g. (0.25 mol.) mono-sodium-S-methyl-O-(3-methyl-4-methylmercaptophenyl)thiol-phosphoric acid ester (prepared in an analogous manner to the corresponding starting material of Example 4) are dissolved in 300 cc. acetonitrile. This solution is first admixed with 1 cc. pyridine and subsequently dropwise, at 25 to 28° C., with 39 g. chloroformic acid-sec-butyl ester. The reaction mixture is thereafter stirred at 60 to 70° C. for a further 3 hours and then worked up as described in Example 2. There are obtained in this manner 67 g. of O-sec-butoxycarbonyl - S - methyl - O - (3 - methyl - 4 - methylmercaptophenyl)-thiol-phosphoric acid ester in the form of a water-insoluble, pale yellow oil.

*Analysis.*—Calculated (for molecular weight 364): P. 8.5%; S, 17.6%. Found: P, 8.5%; S, 16.9%.

On rats per os such compound has a mean toxicity of 250 mg./kg. animal weight.

EXAMPLE 8

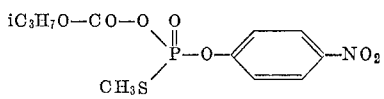
(X)

A solution of 82 g. (0.3 mol.) monosodium-S-methyl-O-(4-nitrophenyl)thiol-phosphoric acid ester in 300 cc. acetone is first admixed with 1 cc. pyridine and subsequently dropwise with 42 g. chloroformic acid isopropyl ester at 25 to 30° C., while stirring. The reaction mixture is thereafter heated at 60 to 70° C., while stirring for a further 2 hours and then worked up as described in Example 2. 70 g. (68% of theory) O-isopropoxy-S-methyl-O-(4-nitrophenyl)thiol-phosphoric acid ester are obtained. Such compound is soluble in water.

*Analysis.*—Calculated (for molecular weight 335): P, 9.3%; S, 9.5%; N, 4.2%. Found: P, 10.0%; S, 10.3%; N, 5.0%.

On rats per os the mean toxicity ($DL_{50}$) of the above compound is 1000 mg./kg. animal weight.

The monosodium-S-methyl-O-(4 - nitrophenyl)thiol-phosphoric acid ester required as starting material may be obtained, for example, as follows:

380 g. (2.5 mol.) sodium iodide are dissolved in 3 liters acetone, and this solution is admixed with 658 g. O,O-dimethyl-O-(4-nitrophenyl)thiono-phosphoric acid ester. The mixture is subsequently stirred at 50° C. for a further 2 hours and the precipitated sodium salt of the following constitution

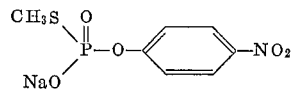
(Xa)

is filtered off with suction.

EXAMPLE 9

In the same way, using corresponding molar amounts of the following starting materials:

(a) Chloroformic acid trichloromethyl ester and monopotassium-S-n-propyl-O-(2 - cyano - 6 - thiocyanophenyl)thiol-phosphoric acid ester (prepared in an analogous manner to the corresponding starting material of Example 2);

(b) Chloroformic acid 2,3-dichloro-n-propyl ester and monoammonium - S - tert - butyl - S - (4 - ethoxy - phenyl)dithiol-phosphoric acid ester (prepared in an analogous manner to the corresponding starting material of Example 2); and (c) Chloroformic acid 1-methyl-2-chloro-ethyl ester and monosodium-S-isopropyl-O-(3-n-propylsulfoxy-5-sec-butylsulfonyl-phenyl)thiol phosphoric acid ester (prepared in an analogous manner to the corresponding starting material of Example 2).

The respective final products are obtained:

(a′) O - trichloromethoxycarbonyl - S - n - propyl - O-(2-cyano-6-thiocyanophenyl)thiol-phosphoric acid ester;

(b′) O - (2,3 - dichloro - n - propoxycarbonyl) - S-tert-butyl-S-(4-ethoxyphenyl)dithiol-phosphoric acid ester; and (c′) O - (1 - methyl - 2 - chloroethoxycarbonyl) - S-isopropyl - O - (3 - n - propylsulfoxyl - 5 - sec - butylsulfonyl-phenyl)thiol-phosphoric acid ester.

Advantageously, in accordance with the present invention in the foregoing formulae:

R represents straight or branched chain lower alkyl such as methyl, ethyl, n-propyl, isopropyl, n-butyl, isobutyl, sec-butyl, tert-butyl, and the like, and especially alkyl having 1-4 carbon atoms, preferably methyl, ethyl, n-propyl, isopropyl, n-butyl, isobutyl, and sec-butyl; or chloro lower alkyl such as chloro substituted methyl to tert-butyl (i.e., $C_{1-4}$ alkyl inclusive) and the like, and especially mono-, di- and trichloro lower alkyl having 1–4 carbon atoms such as mono-, di- and trichloromethyl, ethyl, n-propyl, isopropyl, n-butyl, isobutyl and sec-butyl;

R' represents lower alkyl such as methyl to tert-butyl (i.e., $C_{1-4}$ alkyl inclusive), and especially methyl, ethyl, n-propyl, isopropyl, n-butyl, isobutyl and sec-butyl;

R" represents substituted phenyl which is substituted with at least one of chloro; or nitro; or cyano; or thiocyano; or lower alkyl such as methyl to tert-butyl, and the like, as specifically enumerated above under R (i.e., $C_{1-4}$ alkyl inclusive); or lower alkoxy such as methoxy, ethoxy, n-propoxy, isopropoxy, n-butoxy, isobutoxy, sec-butoxy, tert-butoxy, and the like, especially alkoxy having 1–4 carbon atoms; or lower alkylmercapto, such as methylmercapto, ethylmercapto, n-propylmercapto, isopropylmercapto, n-butylmercapto, isobutylmercapto, sec-butylmercapto, tert-butylmercapto, and the like, especially alkylmercapto having 1–4 carbon atoms in the alkyl moiety; or lower alkyl-, -sulfoxyl (i.e., —SO—) or -sulfonyl (i.e., —SO₂—) such as methyl-to-tert-butyl- (i.e., $C_{1-4}$ alkyl, inclusive), -sulfoxyl or -sulfonyl, and the like; or substituted with mixtures of said chloro, nitro, cyano, thiocyano, lower alkyl, lower alkoxy, lower alkyl mercapto, lower alkyl sulfoxyl and lower alkyl sulfonyl substituents; or N-methyl-benzazimido; or 4-methyl- or 3-chloro-4-methyl-, -coumarin-7-yl; and X is oxygen or sulfur.

R" preferably denotes a 2-, 3- or 4-chlorophenyl, 2,4- or 2,5-dichlorophenyl, 2,4,5- or 2,4,6-trichlorophenyl, 2-chloro-4-methylphenyl, 3-chloro-4-methylphenyl, 3-methyl-4-chlorophenyl, 2-chloro-4-tert-butylphenyl, 2-, 3- or 4-nitrophenyl, 2- or 3-chloro-4-nitrophenyl, 2,5- or 3,5-dichloro-4-nitrophenyl, 2- or 3-methyl-4-nitrophenyl, 3-nitro-4-methylphenyl, 2- or 3-methoxy-4-nitrophenyl, 3-nitro-4-chlorophenyl, 3-nitro-4,6-dichlorophenyl, 2-nitro-4-chlorophenyl, 4-cyanophenyl, 2- or 3-methyl-4-cyanophenyl, 4-thiocyanophenyl, 2- or 3-methyl-4-thiocyanophenyl, 4-methylmercaptophenyl, 4-methyl-sulphoxyphenyl, 4-methylsulphonylphenyl, 3-methyl-4-methylmercaptophenyl, 3,5-dimethyl-4-methylmercaptophenyl, 3-methyl-4-methylsulphoxylphenyl, or 3-methyl-4-methylsulphonylphenyl radical, or furthermore an N-methylbenzazimido- or 3-chloro-4-methylcoumarinyl-(7)-radical; and the like.

In accordance with a particular feature of the present invention, R and R' each respectively is lower alkyl having 1–4 carbon atoms, R" is selected from the group consisting of phenyl which is substituted with a substituent selected from the group consisting of chloro, nitro, lower alkyl having 1–4 carbon atoms, and lower alkyl mercapto having 1–4 carbon atoms, and mixtures of such substituents; N-methylbenzazimido; and 3-chloro-4-methylcoumarin-7-yl; and X is selected from the group consisting of oxygen and sulfur.

In accordance with a most preferred embodiment of the present invention, R and R' each respectively is lower alkyl having 1–4 carbon atoms, R" is trichlorophenyl, and X is oxygen.

All of the foregoing compounds in accordance with the present invention possess the desired strong fungicidal properties, with regard to a broad spectrum of activity, enabling such compounds with a concomitant low toxicity toward warm-blooded creatures and corresponding favorable compatibility with plants to be used more effectively to control and/or eliminate fungi by application of such compounds to the fungi and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. O-alkoxycarbonyl-S-alkyl-thiophosphoric acid aryl ester having the formula

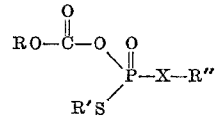

in which R is selected from the group consisting of lower alkyl and chlorolower alkyl, R' is lower alkyl, R" is selected from the group consisting of 2,4,5-trichlorophenyl, 3-lower alkyl-4-lower alkylmercaptophenyl, 4-nitrophenyl, 2-cyano-6-thiocyanophenyl, 4-lower alkoxyphenyl, and 3-lower alkyl sulfoxy-5-lower alkyl sulfonylphenyl, and X is selected from the group consisting of oxygen and sulfur.

2. Ester according to claim 1 wherein R and R' each respectively is lower alkyl having 1–4 carbon atoms, R" is selected from the group consisting of 2,4,5-trichlorophenyl, 3-$C_{1-4}$ alkyl-4-$C_{1-4}$ alkylmercaptophenyl, and 4-nitrophenyl, and X is selected from the group consisting of oxygen and sulfur.

3. Ester according to claim 1 wherein R and R' each respectively is lower alkyl having 1–4 carbon atoms, R" is trichlorophenyl, and X is oxygen.

4. Ester according to claim 1 wherein such compound is O-isopropoxycarbonyl-S-methyl - O - (2,4,5 - trichlorophenyl)thiol-phosphoric acid ester having the formula

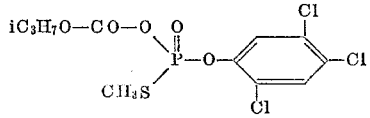

5. Ester according to claim 1 wherein such compound is O-sec butyloxycarbonyl-S-methyl - O - (2,4,5 - trichlorophenyl)thio-phosphoric acid ester having the formula

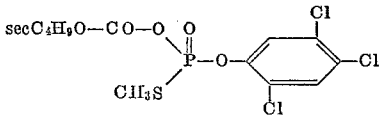

6. Ester according to claim 1 wherein such compound is O-ethoxycarbonyl-S-methyl-O-(2,4,5 - trichlorophenyl)-thiol-phosphoric acid ester having the formula

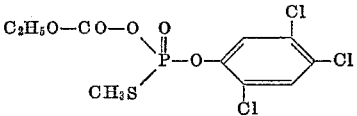

7. Ester according to claim 1 wherein such compound is O-isopropxycarbonyl-S-methyl-O-(3-methyl - 4 - methylmercaptophenyl)thiol-phosphoric acid ester having the formula

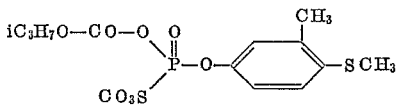

8. Ester according to claim 1 wherein such compound is O-isopropoxycarbonyl-S-methyl-O-(4-nitrophenyl)thiolphosphoric acid ester having the formula

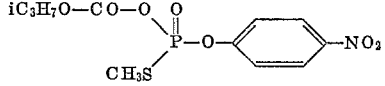

No references cited.

CHARLES B. PARKER, Primary Examiner
ANTON H. SUTTO, Assistant Examiner

U.S. Cl. X.R.
260—248, 454, 345.2; 424—212, 249, 281

PO-1050
(5/69)

UNITED STATES PATENT OFFICE
CERTIFICATE OF CORRECTION

Patent No. 3,457,332  Dated July 22, 1969

Inventor(s) Gerhard Schrader and Hans Scheinpflug

It is certified that error appears in the above-identified patent and that said Letters Patent are hereby corrected as shown below:

Column 5, line 29, "springling" should read --sprinkling--. Column 6, for formula (V) under the column headed "0.005" there should appear --75--. Column 9, line 20, "thiolzphosphoric" should read --thiolphosphoric--. Column 12, line 36, "thiophosphoric" should read --thiol-phosphoric--Column 12, line 52, "0-isopropxycarbonyl" should read --0-isopropoxycarbonyl--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents